US012602828B2

(12) United States Patent
Spolzino et al.

(10) Patent No.: US 12,602,828 B2
(45) Date of Patent: Apr. 14, 2026

(54) MULTI-SENSOR SYSTEM WITH PICTURE-IN-PICTURE IMAGE OUTPUT

(71) Applicant: Datalogic IP Tech S.r.l., Lippo di Calderara di Reno (IT)

(72) Inventors: Simone Spolzino, Bologna (IT); Luca Perugini, Bologna (IT); Davide Bruni, Bologna (IT); Federico Canini, Bologna (IT)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 272 days.

(21) Appl. No.: 18/176,981

(22) Filed: Mar. 1, 2023

(65) Prior Publication Data

US 2024/0296586 A1 Sep. 5, 2024

(51) Int. Cl.
| | |
|---|---|
| *G06T 7/80* | (2017.01) |
| *G06K 7/14* | (2006.01) |
| *G06T 3/40* | (2024.01) |
| *G06T 7/11* | (2017.01) |
| *G06T 7/136* | (2017.01) |
| *G06T 7/174* | (2017.01) |
| *G06T 11/00* | (2006.01) |

(52) U.S. Cl.
CPC .............. *G06T 7/80* (2017.01); *G06K 7/1417* (2013.01); *G06T 3/40* (2013.01); *G06T 7/11* (2017.01); *G06T 7/136* (2017.01); *G06T 7/174* (2017.01); *G06T 11/00* (2013.01); *G06T 2207/10144* (2013.01); *G06T 2207/20016* (2013.01); *G06T 2207/20132* (2013.01)

(58) Field of Classification Search
CPC ... G06T 7/80; G06T 7/136; G06T 7/11; G06T 7/174; G06T 3/40; G06T 11/00; G06T 2207/10144; G06T 2207/20016; G06T 2207/20132; G06K 7/1417
See application file for complete search history.

(56) References Cited

U.S. PATENT DOCUMENTS

| | | | |
|---|---|---|---|
| 5,739,512 | A | 4/1998 | Tognazzini |
| 6,497,366 | B1 | 12/2002 | Burkey et al. |
| 6,533,168 | B1 | 3/2003 | Ching |
| 7,646,922 | B2 | 1/2010 | Au et al. |
| 7,881,537 | B2 | 2/2011 | Ma et al. |

(Continued)

FOREIGN PATENT DOCUMENTS

EP 2320350 A1 5/2011

OTHER PUBLICATIONS

European Patent Office, Extended European Search Report in European Patent Application No. 24159916.6, mailed Jul. 25, 2024, 6 pages.

*Primary Examiner* — Matthew C Bella
*Assistant Examiner* — Jinsu Hwang
(74) *Attorney, Agent, or Firm* — Stoel Rives LLP

(57) ABSTRACT

The disclosure relates to systems and methods for combining images captured by at least two image sensors of a multi-sensor image system into a single image frame for analysis, where the combined image frame includes the image data captured by each sensor. The captured images may include image data for an optical code on an item being processed. The multi-sensor system includes a decoding unit operable to analyze the combined image frame and decode the optical codes from one or both images contained within the combined image frame.

19 Claims, 10 Drawing Sheets

(56)                References Cited

U.S. PATENT DOCUMENTS

| | | | |
|---|---|---|---|
| 8,322,621 B2 | 12/2012 | Olmstead | |
| 8,430,318 B2 | 4/2013 | Mcqueen et al. | |
| 8,496,177 B2 | 7/2013 | Sevier et al. | |
| 9,004,359 B2 | 4/2015 | Shearin et al. | |
| 9,286,502 B1 | 3/2016 | Ashby et al. | |
| 9,305,198 B2 | 4/2016 | Thompson et al. | |
| 9,342,723 B2 | 5/2016 | Liu et al. | |
| 9,489,558 B2 | 11/2016 | Sevier et al. | |
| 9,734,377 B2 | 8/2017 | Sevier et al. | |
| 9,860,536 B2 | 1/2018 | Cilia et al. | |
| 10,049,247 B2 | 8/2018 | Gao | |
| 10,248,896 B2 | 4/2019 | Gao et al. | |
| 10,970,501 B2 | 4/2021 | Gao | |
| 10,970,502 B2 | 4/2021 | Canini et al. | |
| 11,222,401 B2 | 1/2022 | Xian et al. | |
| 11,257,198 B1 * | 2/2022 | Holub | G06V 10/82 |
| 2006/0044741 A1 | 3/2006 | Bussan | |
| 2007/0052734 A1 | 3/2007 | Skinner et al. | |
| 2008/0253608 A1 | 10/2008 | Long et al. | |
| 2009/0295544 A1 | 12/2009 | Bayer et al. | |
| 2010/0127013 A1 | 5/2010 | Butler | |
| 2012/0094258 A1 | 4/2012 | Langheier et al. | |
| 2013/0048706 A1 | 2/2013 | Nahill et al. | |
| 2013/0320087 A1 | 12/2013 | Moran et al. | |
| 2013/0327831 A1 | 12/2013 | Howard | |
| 2014/0082465 A1 | 3/2014 | Jee et al. | |
| 2014/0108963 A1 | 4/2014 | Black et al. | |
| 2014/0226900 A1 * | 8/2014 | Saban | H04N 23/63 |
| | | | 382/165 |
| 2015/0347801 A1 | 12/2015 | Svetal | |
| 2017/0032349 A1 | 2/2017 | Nishida et al. | |
| 2018/0204562 A1 | 7/2018 | Gong et al. | |
| 2018/0247292 A1 | 8/2018 | Crooks et al. | |
| 2018/0365544 A1 | 12/2018 | Gao et al. | |
| 2019/0073499 A1 | 3/2019 | Hardin | |
| 2019/0188432 A1 * | 6/2019 | Lozano | G06K 7/10801 |
| 2020/0012581 A1 | 1/2020 | Landsborough et al. | |
| 2020/0012888 A1 | 1/2020 | Lian et al. | |
| 2020/0125812 A1 | 4/2020 | Canini et al. | |
| 2020/0265231 A1 | 8/2020 | Li et al. | |
| 2020/0311361 A1 | 10/2020 | Gao | |
| 2021/0074045 A1 | 3/2021 | Negro et al. | |
| 2021/0142112 A1 | 5/2021 | Van Oldenborgh et al. | |
| 2022/0092338 A1 | 3/2022 | Yang et al. | |
| 2022/0187459 A1 | 6/2022 | Perugini et al. | |
| 2022/0207969 A1 | 6/2022 | Howard et al. | |
| 2023/0177391 A1 | 6/2023 | Packwood et al. | |
| 2023/0186601 A1 | 6/2023 | Hartley et al. | |

* cited by examiner

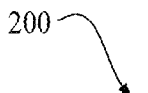
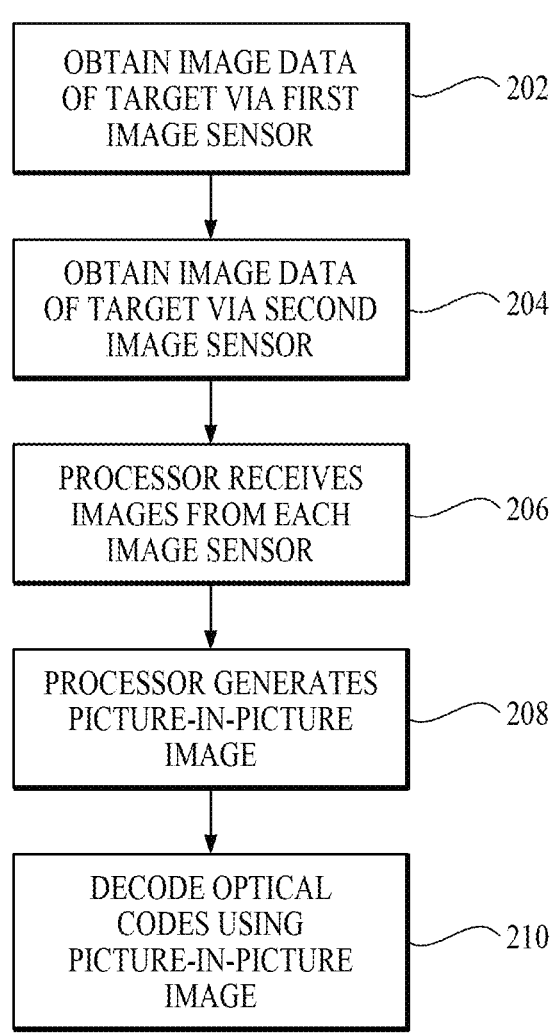
OBTAIN IMAGE DATA OF TARGET VIA FIRST IMAGE SENSOR — 202
OBTAIN IMAGE DATA OF TARGET VIA SECOND IMAGE SENSOR — 204
PROCESSOR RECEIVES IMAGES FROM EACH IMAGE SENSOR — 206
PROCESSOR GENERATES PICTURE-IN-PICTURE IMAGE — 208
DECODE OPTICAL CODES USING PICTURE-IN-PICTURE IMAGE — 210
FIG. 2

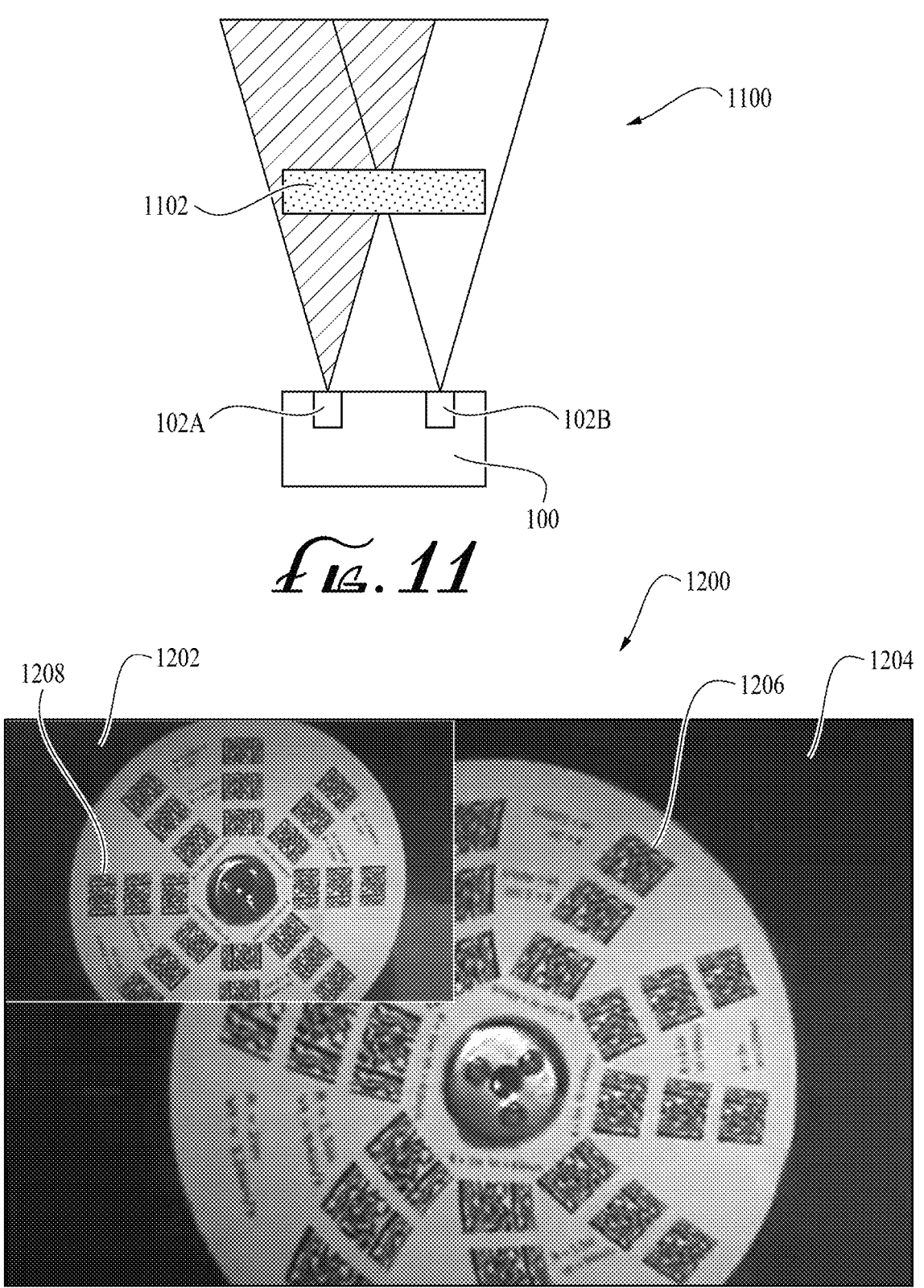
1100
1102
102A     102B
100
𝓕𝓲𝓰.11
1200
1208     1202
1206     1204
𝓕𝓲𝓰.12

MULTI-SENSOR SYSTEM WITH PICTURE-IN-PICTURE IMAGE OUTPUT

BACKGROUND

The present disclosure relates generally to the field of image processing, and in particular, to techniques for image processing optimized for use in a multi-sensor system to generate a picture-in-picture image combining the image data obtained by the sensors for efficient processing.

In conventional image-processing systems using an arrangement of multiple cameras or other suitable image sensors, images of a scene are obtained by several image sensors and processed to analyze image information captured by the respective image sensors. In some configurations, the multi-sensor system may obtain various images of the scene, where instead of subsequently processing each image to analyze the image data, the system selects one image for processing from the captured set of images to optimize the overall image analysis. In some arrangements, the image sensors may operate with the same technologies and parameters (e.g., focal lengths, image formats, and image resolution), thereby streamlining these conventional image processing techniques since the system operates with consistent image data. However, in other arrangements, the image sensors may include different configurations and output different image formats relative to one another, thereby introducing additional complexities since the processing units require additional capabilities to properly analyze the images in these various formats.

For example, in one multi-sensor system having an extended depth-of-field and decoding range, where the system may be used in a retail environment for obtaining images of items and processing optical codes therefrom, the system may integrate multiple image sensors with different focal distances and fields-of-view. In this arrangement, one image sensor may be configured and specialized for obtaining images and decoding optical codes for items that are in a near field relative to the image sensor, while another image sensor may be configured and specialized for obtaining images and decoding optical codes for items that are in a far field relative that image sensor. In some configurations, the image sensors may have different resolutions and image output formats. For example, the first image sensor (i.e., the near-field image sensor) may output higher resolution images of the target (e.g., 1920×1080) as compared to the second image sensor (e.g., the far-field image sensor), which may output lower resolution images of the target (e.g., 1280×800). In other configurations, the multi-sensor system may include image sensors operating under different technologies. For example, the first image sensor may be a monochromatic image sensor and the second image sensor may be a color image sensor. In another configuration, the first image sensor may be a rolling shutter camera and the second image sensor may be a global shutter camera.

Multi-sensor systems configured with image sensors having different operating parameters, image outputs, and/or technologies typically present various image-processing challenges and rely on computationally intensive image-analysis algorithms to process the array of images obtained from the sensors. Accordingly, the inventors have identified a need for a streamlined multi-sensor system designed for efficiently processing images in system configurations where the image sensors may output images with different formats, sizes, and resolution, or where the image sensors may operate with different parameters and technologies relative to each other. Additional aspects and advantages of such methods will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 2 is a flowchart illustrating an example image-processing method for generating and decoding a picture-in-picture image for the multi-sensor system of FIG. 1 in accordance with one embodiment.

FIG. 11 is a schematic illustration for an image stitching process for combining images from sensors of the multi-sensor system of FIG. 1 to decode an optical code in accordance with one embodiment.

FIG. 12 illustrates an example picture-in-picture image for the multi-sensor system of FIG. 1 using images captured by a global shutter camera (upper left corner) and a rolling shutter camera (background) in accordance with one embodiment.

DETAILED DESCRIPTION OF DISCLOSED EMBODIMENTS

Figure 1:
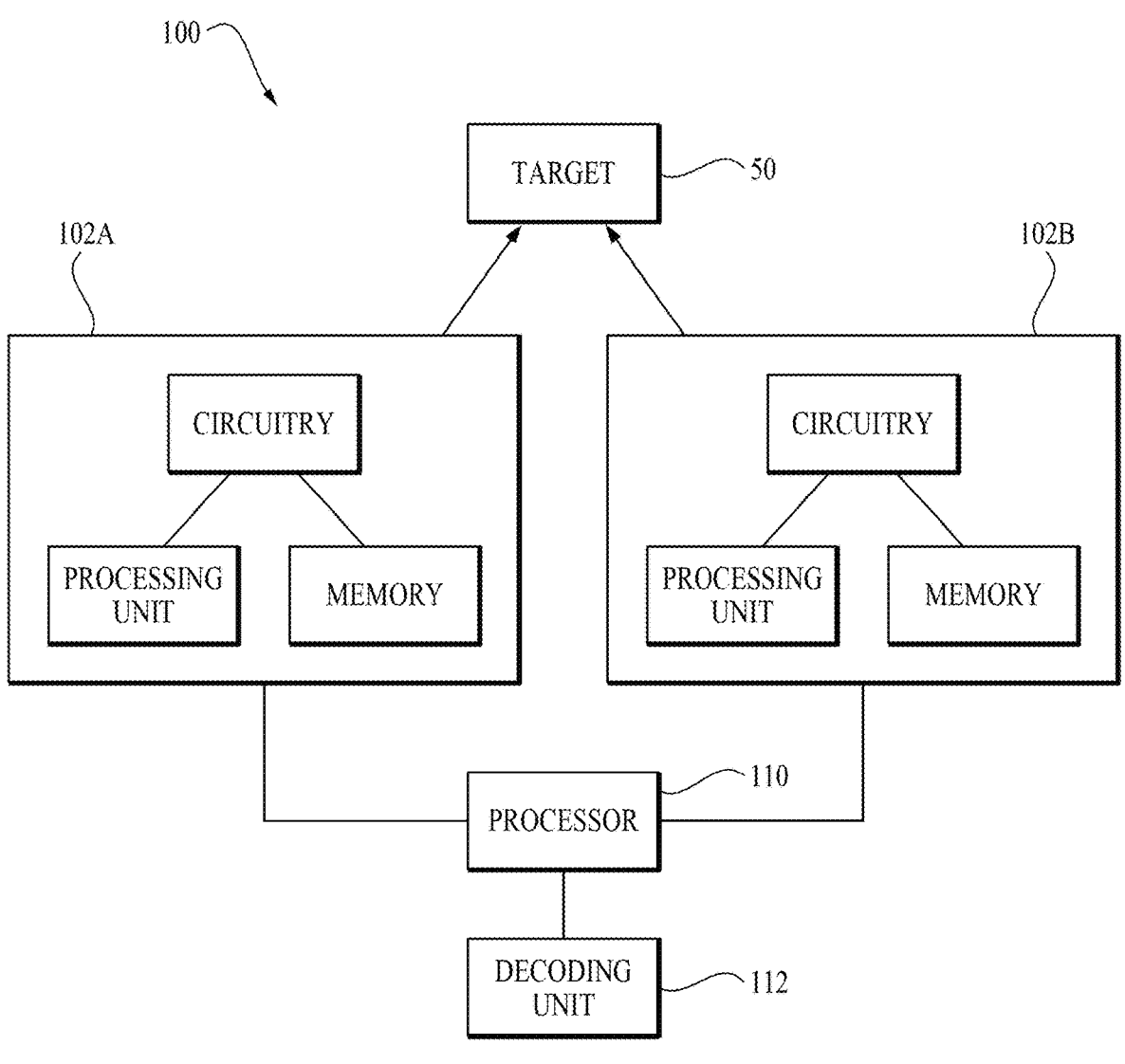
FIG. 1 illustrates components of a multi-sensor system in accordance with one example embodiment.

With reference to the drawings, this section describes particular embodiments of a multi-sensor system and its detailed construction and operation for streamlining image-processing techniques. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and example embodiments, certain embodiments may describe the multi-sensor system in the context of a retail establishment, where the multi-sensor system is designed to process images captured from multiple image sensors and decode any optical codes captured in the images. In these embodiments, the image sensors may include any suitable components for capturing images from a target item and any suitable reading engine configuration for processing and decoding the captured data. In addition, reference in the following description is made to a multi-sensor system including two image sensors capable of capturing images of the target item for further processing. It should be understood that these references are merely example uses and configurations for the described systems and methods and should not be considered as limiting. For example, in other embodiments, the multi-sensor system may incorporate more than two image sensors without departing from the primary principles of the disclosed subject matter. In describing certain of these embodiments, the description may reference a "first," "second," "third," and/or "fourth" image sensor as a convenient way of distinguishing between similar elements or components. It should be understood that use of these descriptors is not intended to imply any particular order or require a specific number of elements or components unless otherwise stated. Similarly, the singular forms "a," "an," and "the" are intended to include the plural forms as well, unless the context clearly indicates otherwise. Moreover, the image-processing techniques described herein may apply to various suitable multi-sensor systems designed for uses other than for decoding optical codes from images in a retail setting. One having ordinary skill in the art understands that the disclosed subject matter may be applied to other suitable image-processing devices used in other settings.

As further described in detail below with reference to the figures, in the multi-sensor system disclosed herein, images of a target item obtained from two image sensors are fused together in a picture-in-picture image format to produce a single image containing image data from each sensor. In one configuration, the picture-in-picture image includes a first image of a smaller size obtained from one image sensor superimposed or merged onto a second image of a larger size obtained from the second image sensor. The first image may be smaller as compared to the second image because the image sensor may have a lower resolution as compared to the other image sensor or the first image may be processed using binning, windowing, skinning, subsampling, or other suitable imaging techniques to resize the image as desired. In some embodiments, the two images in the picture-in-picture image may both be monochromatic, or one may be a color image and the other a monochromatic image, or one may be captured using a global shutter camera and the other captured using a rolling shutter camera, or obtained via other suitable combination of imaging sensors. Once the picture-in-picture image is generated, the combined image containing image data from each image sensor is processed to decode any optical codes captured in either or both of the first and second images.

One advantage of the described configuration is that the multi-sensor system is always processing output images of a uniform size, thereby allowing the system to efficiently perform image analysis through simultaneous processing of the image information captured by each of the image sensors. Moreover, this configuration allows the multi-sensor system to process images and decode optical codes without requiring prior knowledge of which image sensor may have captured a decodable image or without needed to select a particular image sensor as an input source for processing since image data from both image sensors is processed. For example, the multi-sensor system may include one image sensor specialized for capturing high resolution images of near targets and may include another image sensor specialized for capturing lower resolution images of farther away targets. Since the multi-sensor system is capable of processing image data from both image sensors simultaneously, the target optical code may be decoded from the image data captured by either or both sensors without the multi-sensor system first having to know the distance to the target item and then selecting the appropriate image sensor for processing.

In the case of long-range scan engines or for systems having very high-resolution decoding needs, the disclosed subject matter helps improve the depth-of-field (DOF) of the scan engines using multiple image sensors that may have different resolutions, image sizes, and image formats. As noted above, the improved system and image-processing techniques are designed to optimize overall efficiency and performance by avoiding processing delays caused by the system having to identify which image sensor may have captured an appropriate image for processing, or by requiring the system to separately process the image from each sensor.

Moreover, in a configuration where the multi-sensor system uses a color image sensor and a monochromatic image sensor, the system may be able to simultaneously decode both a color-coded or watermark code and a monochromatic optical code in the same combined image for items that contain both types of codes. Similarly, in a configuration where the multi-sensor system uses a global shutter camera and a rolling shutter camera, the higher motion tolerance of the global shutter camera may be used to capture images of moving targets, while combined with the lower cost (and usually higher resolution) rolling shutter camera to be used where motion tolerance is not needed to process images as desired in a variety of environments.

With reference to the figures, the following discussion provides a general overview of an example multi-sensor system followed by examples and methods for combining image streams from multiple image sensors to generate a picture-in-picture image for efficient processing as described above. Additional details of these and other embodiments of the multi-sensor system are further discussed below with reference to the accompanying figures.

FIG. 1 is a schematic illustration of a multi-sensor system 100 in accordance with one example embodiment. With reference to FIG. 1, the multi-sensor system 100 includes a plurality of image sensors 102A, 102B configured to capture image data from an environment including a target object 50, where the image data includes an optical code with coded information present on the target object 50. As noted previously, while the multi-sensor system 100 of FIG. 1 is illustrated and described with reference to a configuration having two image sensors 102A, 102B for simplicity, it should be understood that other configurations may incorporate additional image sensors without departing from the principles of the disclosed subject matter.

As illustrated in FIG. 1, each image sensors 102A, 102B has circuitry 104 including various suitable components and configurations as necessary for operating the image sensors 102A, 102B. Accordingly, circuitry 104 may include one or more processing units 106 which may be any of various suitable commercially available processors or other logic machine capable of executing instructions. In other embodiments, suitable dual microprocessors or other multi-processor architectures may also be employed as the processing unit 106. The circuitry 104 may further include memory 108 which may be implemented using one or more suitable standard memory devices, including RAM, ROM, EEPROM devices, and may also include magnetic or optical storage devices, such as hard disk drives, CD-ROM drives, and DVD-ROM drives. Any number of program modules may be stored in memory 108, including one or more application programs or modules (such as instructions to implement the methods described herein) for controlling features of the image sensors 102A, 102B. All or portions of the program modules may also be cached in RAM. While the illustrated embodiment depicts one possible configuration for suitable circuitry 104, it should be recognized that a wide variety of hardware and software configurations may be provided for the image sensors 102A, 102B. For example, other embodiments may have fewer than all of these components or may contain additional components.

For purposes of this disclosure, reference to an "image sensor" is used in an expansive sense to describe any suitable device (or combination of devices) capable of obtaining image data for decoding coded information from the target item. In some embodiments, the image sensor may include a camera or other suitable imaging system, a processor, a decoding unit, and a controller for communicating data to other external systems for processing. In other embodiments, the image sensor may include a subset of these components within a common housing and other components may be external to the image sensor itself. For example, in one embodiment, the image sensors may each include an imager designed to obtain images of the target item and communicate those images to a separate processor or other suitable decoding unit for processing the images and decoding the coded information.

Returning to FIG. 1, each of the image sensors 102A, 102B may be coupled with suitable optical components to enable capture of image data within a particular field-of-view, where each image sensor 102A, 102B is configured to capture image data of the target object 50 and output an image of a particular size and resolution depending on the configuration and operational parameters of the image sensors 102A, 102B. In some embodiments, the image size, resolution, and field-of-views for the image sensors 102A, 102B may be different. For example, in one embodiment, image sensor 102A may be configured with a near-field field-of-view to capture near-field image data of an environment, while image sensor 102B may be configured with a far-field field-of-view to capture far-field image data of the environment. In other embodiments, the image sensors 102A, 102B may instead be configured to capture different portions of the same field or two different environments representing two different fields, or other suitable environments as desired. As described previously, the image sensors 102A, 102B in some embodiments may each be monochromatic image sensors, or image sensor 102A may be a monochromatic image sensor and image sensor 102B may be a color image sensor. In other embodiments, image sensor 102A may instead be a rolling shutter camera and image sensor 102B may be a global shutter camera. In still other embodiments, the multi-sensor system 100 may include other suitable image sensor combinations.

The image data captured by the individual image sensors 102A, 102B is processed and combined via a processor 110 in communication with each image sensors 102A, 102B. The processor 110 receives the image data from the image sensors 102A, 102B and generates a picture-in-picture image (see FIG. 4 for example) containing the image data from each image sensor 102A, 102B. In some embodiments, one of the image sensors 102A outputs a full image resolution/size to the processor 110, while the other of the image sensors 102B outputs an image with a reduced size (due to either being a lower resolution image sensor or having undergone various image processing techniques as described in further detail below). In other embodiments, the processor 110 may resize one of the images to reduce its overall footprint when generating the picture-in-picture image. As further detailed below, the purpose of resizing one of the images is to minimize potential overlap or occlusions in the picture-in-picture image combining the image data streams. Further details and examples of these embodiments are provided below with reference to FIGS. 3-13.

The processor 110 may include processing circuitry configured for executing suitable instructions and performing the operations described herein. Although a single block is shown representing the processor 110, it is contemplated that some embodiments may include multiple processing components (e.g., FPGAs, CPLDs, microprocessors, microcontrollers, etc.) configured to merge the image streams and generate the combined image as described herein. Further, the processor 110 may include, or be associated with, any suitable memory or storage devices storing instructions for performing the operations described herein.

Returning to FIG. 1, the multi-sensor system 100 further includes a decoding unit 112 operable to process the picture-in-picture image generated by the processor 110 and simultaneously decode any optical codes captured by the image sensors 102A, 102B. Although the decoding unit 112 is shown as a separate component in FIG. 1, in other embodiments, the decoding unit 112 may be an integral component of the processor 110. In still other embodiments, the processor 110 capable of merging images, such as in the picture-in-picture image format described previously, and the decoding unit 112 may be on different platforms (i.e., an external host platform) and connected with video interfaces, such as MIPI CSI-2 or other suitable interfaces. In any configuration, the decoding unit 112 may include any suitable decoding algorithms to decode coded information obtained from the target item that may be contained within one-dimensional codes, two-dimensional codes, stacked codes, color codes, watermark codes, or other suitable code configurations.

It should be understood that the multi-sensor system 100 of FIG. 1 is illustrated with certain basic components for simplicity and to provide a general understanding of the system. Accordingly, the multi-sensor system 100 and/or the image sensors 102A, 102B may include additional components not described herein in other configurations.

FIG. 2 is a flowchart illustrating an example image-processing method 200 for combining the image streams from the image sensors 102A, 102B and generating a picture-in-picture image for processing in accordance with one embodiment. To establish a frame of reference, FIG. 2 proceeds with a configuration for the multi-sensor system 100 including two image sensors, a near-field image sensor 102A and a far-field image sensor 102B. As noted previously, it should be understood that the following discussion with this configuration is for illustration purposes only, and that in other embodiments, sensors 102A, 102B may include different characteristics, operating technologies, operational settings, etc. without departing from the principles described herein. It should also be understood that in other embodiments, the multi-sensor system 100 may include more than two image sensors, such as a three-sensor, four-sensor, or n-sensor arrangement (where n represents any number of sensors). Additional details of an example embodiment for a multi-sensor system including at least four image sensors is provided with reference to FIG. 14 below.

With reference to FIG. 2, at step 202, the image sensor 102A captures image data of the target item 50. In some embodiments, the image data obtained by the image sensor 102A includes an image of the item 50 based on the near-field field-of-view of the image sensor 102A, where the image includes (or may be stitched together with other images to include) an optical code associated with the item 50. The item image(s) may include monochromatic images, color images, or other suitable image formats depending on the configuration of the image sensor 102A. Similarly, at step 204, the image sensor 102B captures image data of the target item 50. In a similar fashion as described above, the image data obtained by the image sensor 102B includes an image of the item 50 based on the far-field field-of-view of the image sensor 102B, where the image includes (or is stitched together with other images to include) an optical code associated with the item 50. The item image(s) may include monochromatic images, color images, or other suitable image formats depending on the configuration of the image sensor 102B. It should be understood that while steps 202 and 204 are illustrated as separate steps in the method 200, the image-capture process from the image sensors 102A, 102B may occur simultaneously or substantially simultaneously.

At step 206, the processor 110 receives the images from the image sensors 102A, 102B. In some embodiments, the processor 110 may further process the images to improve various image characteristics, such as contrast, brightness, color, or other suitable image characteristics for processing. Thereafter, at step 208, the processor 110 merges the image data from the image sensors 102A, 102B to generate a single, combined image containing the image data from each sensor 102A, 102B. The combined image may incorporate the image data from the sensors 102A, 102B in various configurations as further described in detail below with reference to FIGS. 3-13. Preferably, the combined image is generated in a picture-in-picture format, where a first portion of the picture-in-picture image includes image data from the first sensor 102A and a second portion of the picture-in-picture image includes image data from the second sensor 102B. In some embodiments, the picture-in-picture image format may be generated by including image data from the imaging sensor with a lower resolution (e.g., the far-field image sensor 102B) superimposed on a region (e.g. an upper or lower left-hand corner, an upper or lower right-hand corner, or other suitable configuration) of the image coming from the image sensor with a higher resolution (e.g., the near-field image sensor 102A). For clarity, the description is not limited to an embodiment where one image sensor has a lower native resolution than the other. In some embodiments, the imaging sensors 102A, 102B may have the same native resolution (or one may have a higher resolution than the other), but one image (including the image of the higher resolution sensor) may be processed (e.g., via binning, windowing, or other process techniques further described herein) such that it ultimately has a lower resolution as compared to the other. In these embodiments, that lower resolution image, regardless of which image sensor obtained it, may be superimposed onto the higher resolution in the picture-in-picture image.

One advantage of superimposing the lower resolution image onto the higher resolution image is that the lower resolution image tends to be of a smaller size as compared to the higher resolution image, thereby reducing the likelihood that the lower resolution image may overlap with the higher resolution image when the picture-in-picture image is generated. In other embodiments, the lower resolution image may be further processed, such as by windowing or binning techniques, to reduce the image size and minimize obstructions as further discussed in detail below.

At step 210, once the picture-in-picture image format is generated, the decoding unit 112 processes the combined image and simultaneously decodes any optical codes found in either or both the first image and the second image that comprise the combined image. In many embodiments, the picture-in-picture image is generated where both images from the image sensors 102A, 102B capture the optical codes from the target 50 with sufficient resolution such that the decoding unit 112 is able to successfully decode the optical codes captured by both image sensors 102A, 102B. In other embodiments, such as where the background image may be partially or fully obstructed by the superimposed image in the picture-in-picture image, the decoding unit 112 may still be able to decode the optical code using the second image. In some such embodiments, the decoding unit 112 may still be able to decode the optical code in the partially obstructed background image if the resolution is sufficiently high and a readable portion of the optical code is unobstructed. Additional examples of these embodiments are described in detail below.

By combining the images from multiple sensors 102A, 102B to generate a single image containing image data from both sensors, the method 200 allows the multi-sensor system 100 to efficiently decode optical codes regardless of whether the target item 50 is located in a near-field field-of-view or a far-field field-of-view (or a mid-field field-of-view) relative to a position of the image sensors 102A, 102B. Further, the multi-sensor system 100 does not need to know or calculate any distance information to the target 50 since the decoding unit 112 utilizes both then near-field image and the far-field image to process and decode optical codes from the target 50 regardless of distance. Further, by combining the image data from the image sensors 102A, 102B into a single picture-in-picture image of uniform size, the system 100 does not need to assess and determine which image input to process since the images captured from the image sensors 102A, 102B are processed simultaneously in a combined image.

Figure 14:
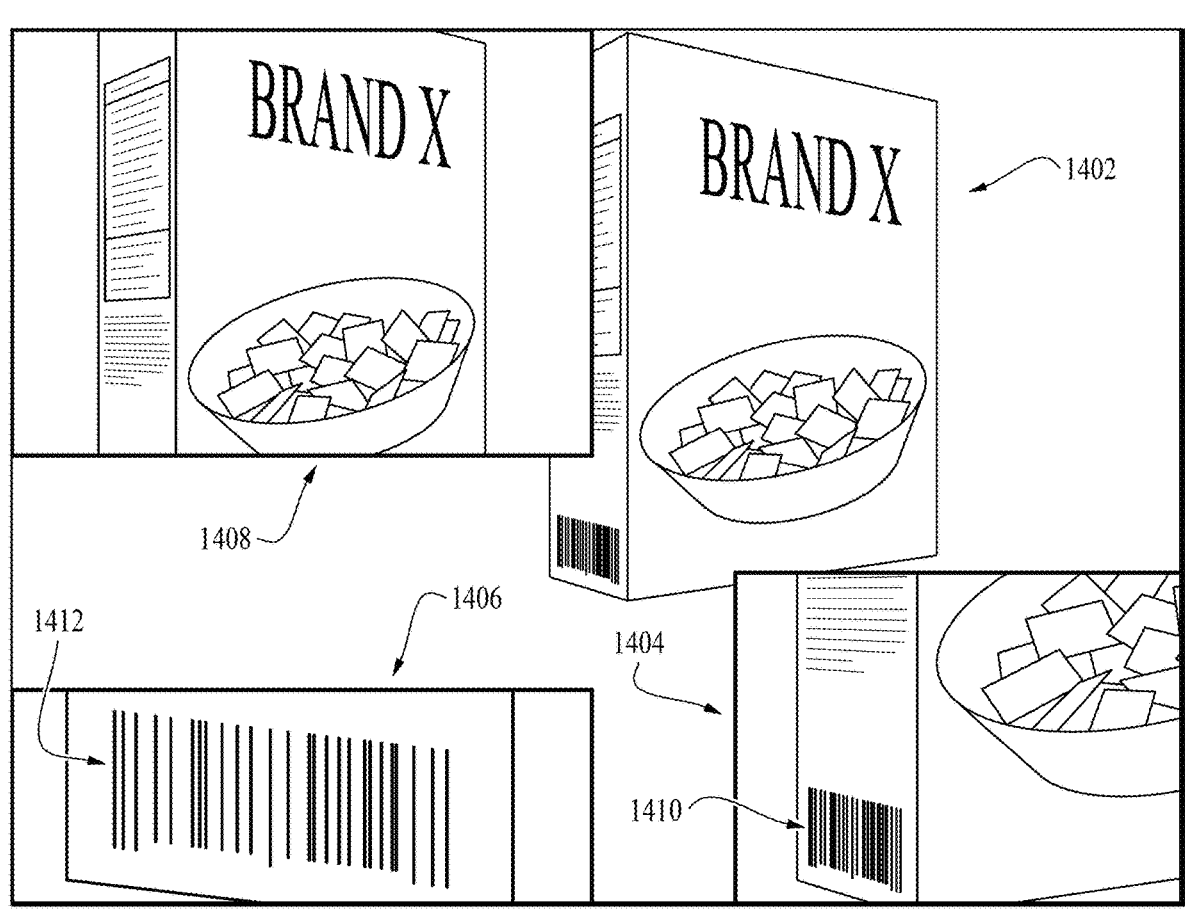
FIG. 14 illustrates an example picture-in-picture image for a multi-sensor system using images captured by a near-field image sensor (background), a color sensor (upper left corner), a far-field image sensor (lower left corner), and a midrange image sensor (lower right corner) in accordance with another embodiment.

FIGS. 3-8 collectively illustrate examples of picture-in-picture images generated via the method step 200 in accordance with various embodiments. It should be understood that the various examples are for illustration purposes only and are not intended to be limiting. As noted previously with specific reference to FIG. 2, the embodiments illustrated in FIGS. 3-8 also illustrate a multi-sensor system with two image sensors. This two-image sensor configuration is illustrated to simplify the description and avoid obscuring pertinent aspects of the disclosed subject matter. However, it should be understood that the multi-sensor system may be configured with any number of sensors without departing from the principles of the claimed subject matter. For example, FIG. 14 illustrates a multi-sensor system including at least four image sensors for obtaining and processing image data as further discussed below with reference to that figure.

Figure 3:
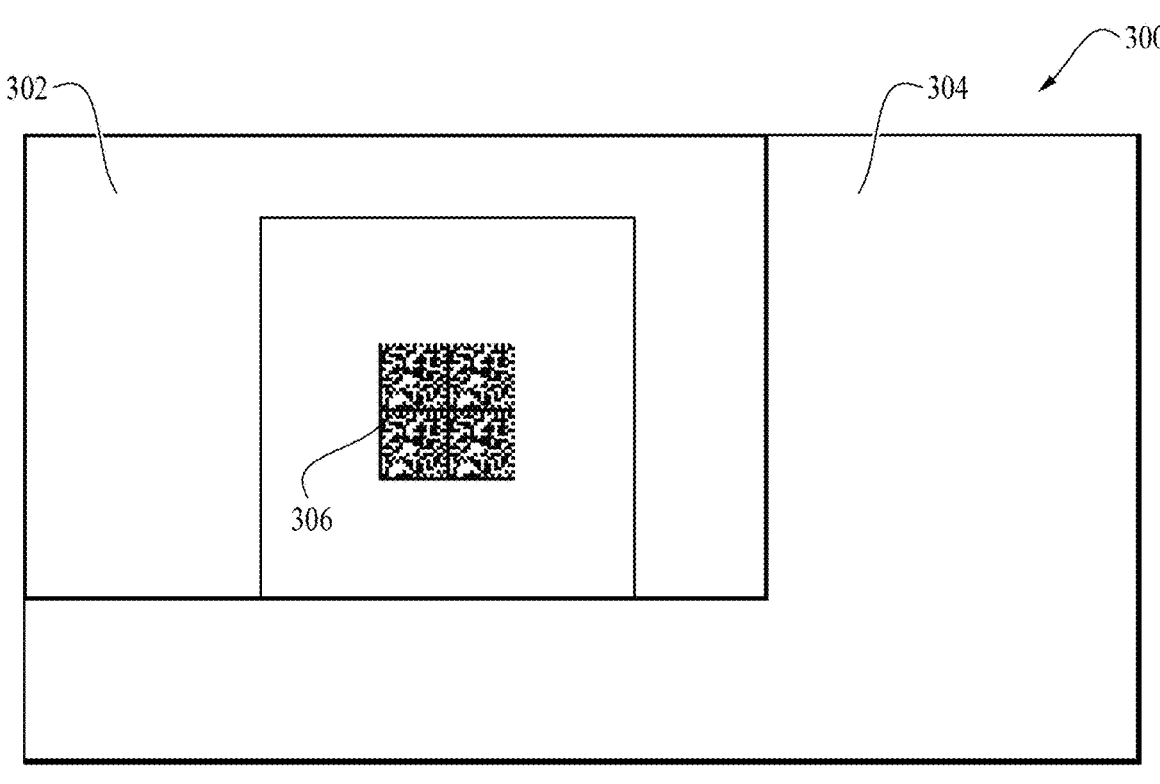
FIG. 3 illustrates an example picture-in-picture image for the multi-sensor system of FIG. 1 using images captured by a far-field image sensor (upper left corner) and a near-field image sensor (background) in accordance with one embodiment.

FIG. 3 illustrates an example picture-in-picture image output 300 for the multi-sensor system of FIG. 1 using images captured by a far-field image sensor 102B (image output in the upper left corner) and a near-field image sensor 102A (background image with some information partially obscured) in accordance with one embodiment. In the example of FIG. 3, the near-field image sensor 102A is configured with full 2MP resolution (1920×1080) and the far-field image sensor 102B is configured with 1MP resolution (1280×800). With reference to FIG. 3, the resulting picture-in-picture image 300 generated by the processor 110 includes the far-field image 302 superimposed on the near-field image 304. As illustrated, the optical code 306 for the target item 50 is clearly captured in a central portion of the far-field image 302. However, when the picture-in-picture image 300 is generated, the image size of the far-field image 302 is rather large and obscures the near-field image 304. As such, no optical code in the near-field image 304 is visible for processing. While the optical code 306 may be easily decodable by the decoding unit 112 from the picture-in-picture image 300, the optical code (not shown) captured by the near-field image sensor 102A cannot be decoded.

In these situations, the far-field image 306 may be resized as needed to minimize its overall footprint and ensure that the picture-in-picture image 300 includes an optical code captured by both image sensors 102A, 102B. As described above with reference to method 200, in some embodiments, the processor 110 may employ various image-resizing techniques to reduce the image size of the far-field image 302 prior to generating the picture-in-picture image. For example, one such technique may include binning, an image-processing technique whereby adjacent subsets of pixels are merged to create a smaller image having a lower resolution as compared to the original image. Binning also reduces pixel noise and improves low light performance since pixels may be summed or averaged as part of the process. However, since the optical code in the image is usually relatively close, the loss of resolution in the far-field image 302 resulting from binning may not be an issue for decoding.

Figure 4:
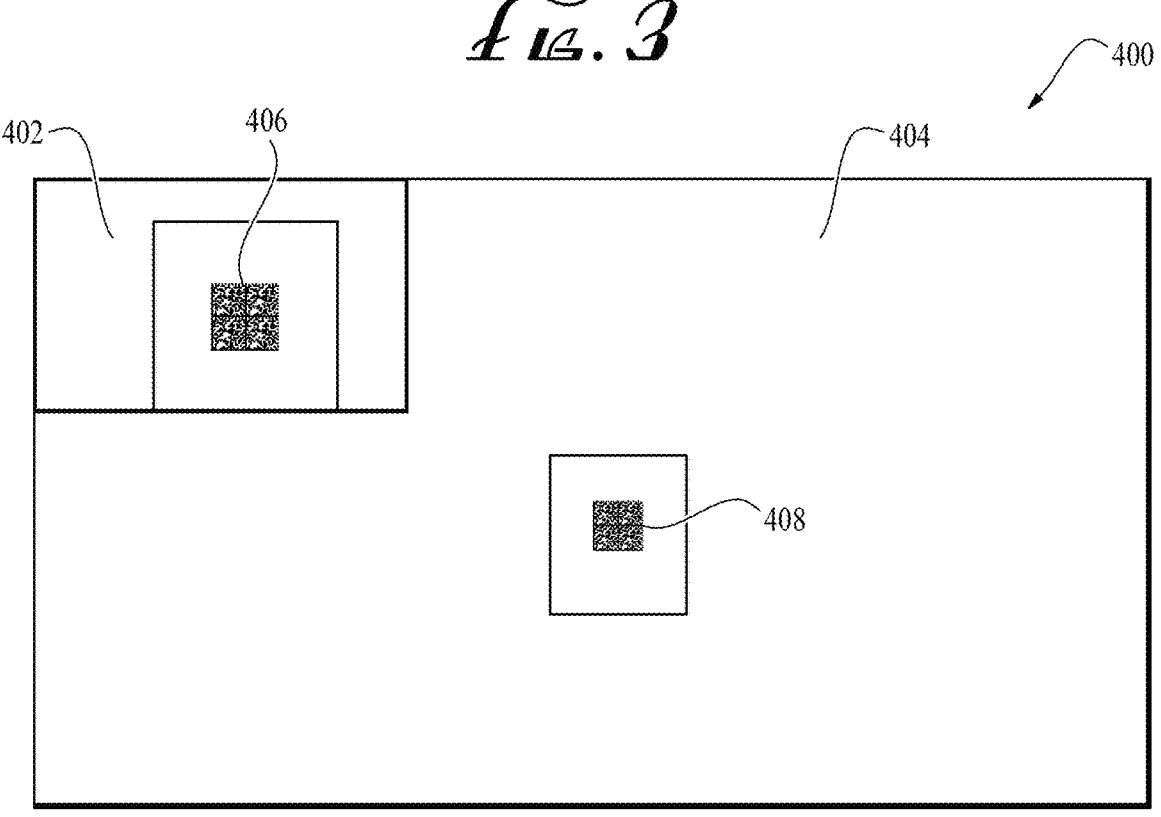
FIG. 4 illustrates an example picture-in-picture image for the multi-sensor system of FIG. 1 using images captured by a far-field image sensor (upper left corner) and a near-field image sensor (background), where the far-field image includes 2×2 binning to reduce image size in accordance with one embodiment.

FIG. 4 illustrates an example embodiment of a picture-in-picture image 400 generated using a binning process to reduce the image size of the far-field image 402. With reference to FIG. 4, a 2×2 bin (where four adjacent pixels are merged into one) has been applied to the far-field image 302 of FIG. 3, resulting in a far-field image 402 that is four times smaller. As illustrated in FIG. 4, the picture-in-picture image 400 includes the much smaller far-field image 402 that occupies a smaller footprint (at a reduced resolution) in the upper left-hand corner of the frame, with the optical code 406 visible. In this configuration, a larger portion of the near-field image 404 obtained by the near-field image sensor 102A is now visible in the central portion of the picture-in-picture image 400 along with the optical code 408 captured by the near-field image sensor 102A. In this configuration, the decoding unit 112 is easily able to decode both optical codes 406, 408 when the picture-in-picture image 400 is processed.

Figure 5:
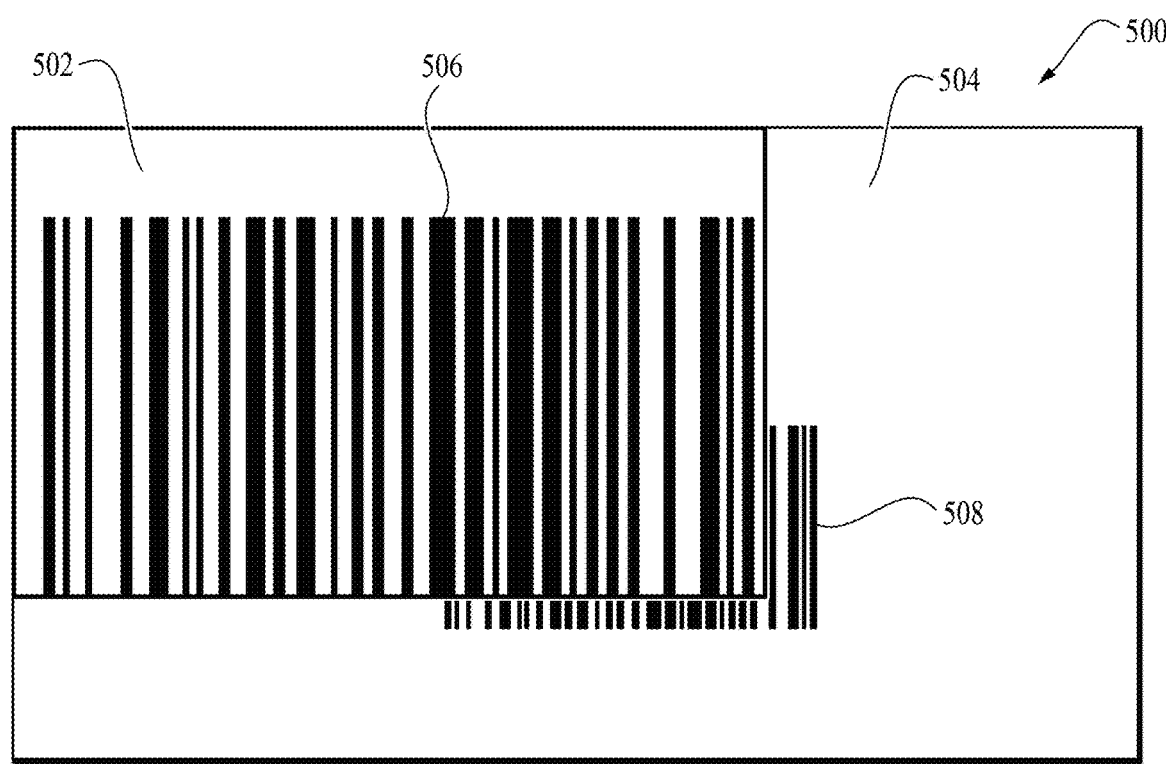
FIG. 5 illustrates an example picture-in-picture image for the multi-sensor system of FIG. 1 using images captured by a far-field image sensor (upper left corner) and a near-field image sensor (background) in accordance with one embodiment.

In some data reading scenarios, the target item 50 may be located at a distance that is at the limit of the field-of-view of the far-field image sensor 102B. Accordingly, the resulting far-field image and the captured optical code may be relatively large such that the far-field image may occupy a larger portion of the picture-in-picture image and may obscure a large portion of the optical code captured by the near-field image sensors. For example, FIG. 5 illustrates an embodiment for a picture-in-picture image 500 including a far-field image 502 superimposed on a near-field image 504 in a similar fashion as described above. As illustrated in FIG. 5, the far-field image 502 includes a sizeable footprint with an optical code 506 that partially obscures the optical code 508 in the near-field image 504. In some embodiments, the decoding unit 112 is still able to decode both optical codes 506, 508 even though only a portion of the optical code 508 in the near-field image 504 was captured. In these embodiments, the decoding unit 112 is able to use the lower portion of the picture-in-picture image 500, which contains sufficient portions of the optical code 508 for decoding purposes.

Figure 6:
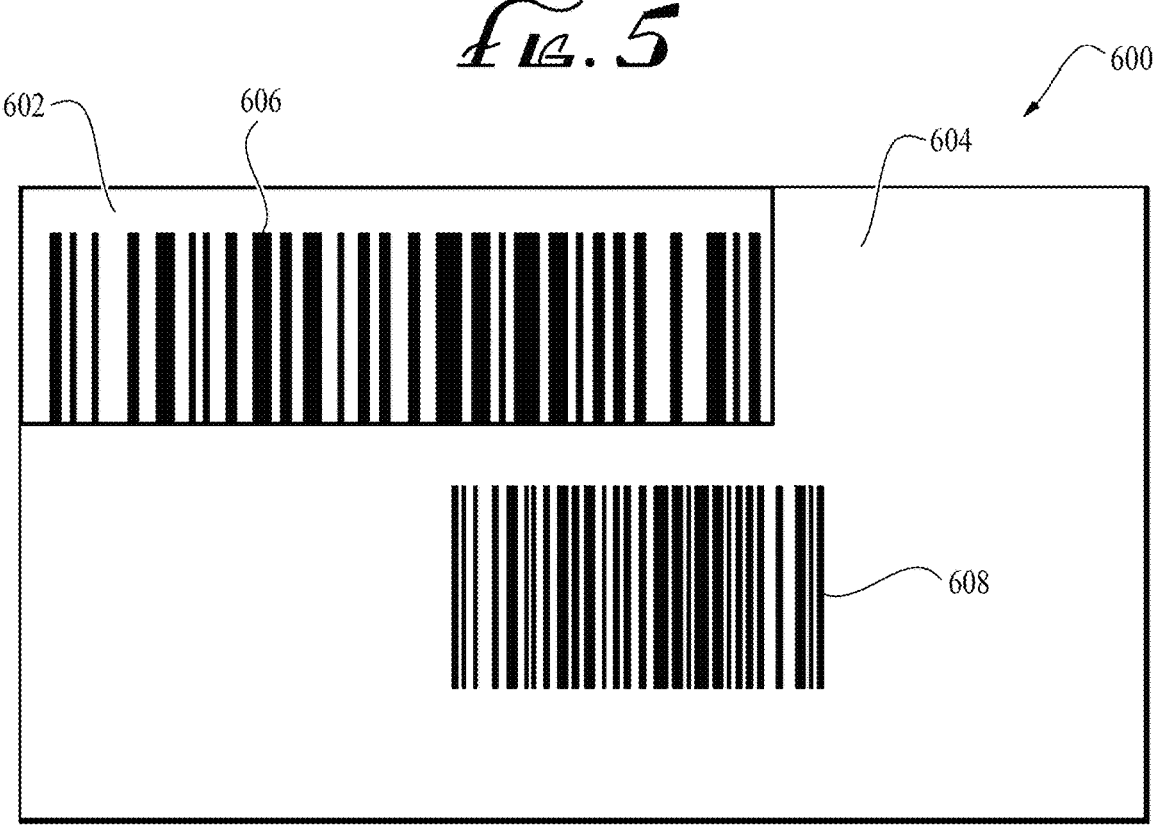
FIG. 6 illustrates an example picture-in-picture image for the multi-sensor system of FIG. 1 using images captured by a far-field image sensor (upper left corner) and a near-field image sensor (background), where the far-field image includes 2×1 binning to reduce image size in accordance with one embodiment.

In a similar fashion as discussed with reference to FIGS. 3-4 previously, in some embodiments, the processor 110 may resize the far-field image to reduce the overlap between the images and allow the decoding unit 112 to process both optical codes in situations where an insufficient portion of the optical code in the near-field image is decodable from the combined image. FIG. 6 illustrates an example picture-in-picture image output 600 using images captured by the far-field image sensor 102B (upper left corner) and the near-field image sensor 102A (background), where a 2×1 bin has been applied to the far-field image 602 to reduce its image size in accordance with one embodiment. As illustrated in FIG. 6, the binning technique allows for the optical codes 606, 608 in the respective far-field image 602 and the near-field image 604 to be visible in the picture-in-picture image 600 and easily decodable by the decoding unit 112.

Figure 7:
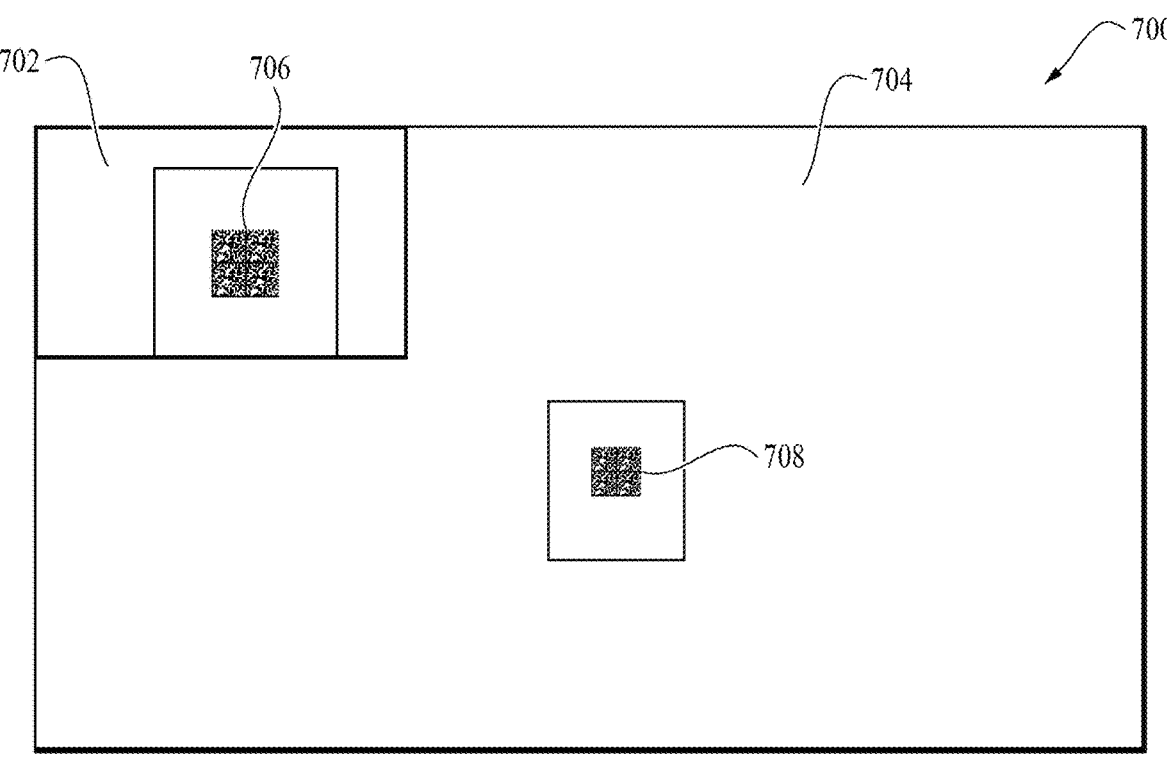
FIG. 7 illustrates an example picture-in-picture image for the multi-sensor system of FIG. 1 using images captured by a far-field image sensor (upper left corner) and a near-field image sensor (center), where the far-field image includes windowing to reduce image size in accordance with one embodiment.

In some embodiments, such as if the optical code in the far-field image is too far or otherwise lacks sufficient resolution, a binning technique may not be optimal since it may reduce the image size and resolution such that the resulting far-field image may not be decodable by the decoding unit 112. In such embodiments, a different image-sizing technique may be applied. For example, one such technique may include a windowing process to extract a region-of-interest from the image and output the image data contained in the region-of-interest for processing, where the windowing technique does not impact resolution of the image. FIG. 7 illustrates an example picture-in-picture image output 700 using images captured by a far-field image sensor 102B (upper left corner) and a near-field image sensor 102A (background), where a windowing technique has been applied to the far-field image 702 to extract a region-of-interest (typically a central region in the image since that is most likely to contain the optical code) including the optical code 704. As illustrated in FIG. 7, the windowing technique allows for the optical codes 706, 708 in the respective far-field image 702 and the near-field image 704 to be visible in the picture-in-picture image 700 and easily decodable by the decoding unit 112. In some embodiments, if the optical code 706 in the far-field image 702 is too large such that it is partially cropped by the selected windowing parameters, then the windowing process may be reapplied with a larger region-of-interest to attempt capturing all or at least a decodable portion of the optical code 706 as desired.

In the embodiments of FIGS. 3-7, the picture-in-picture image formats illustrated include one smaller image (typically that from the far-field image sensor 102B) positioned along an upper corner of the frame to minimize potential overlap with the background image (typically that from the near-field image sensor 102A). In other embodiments, such as where the image sensors 102A, 102B output images having an equal number of rows or columns (e.g., 1920×800 and 1280×800, or 1280×800 and 1280×960), the images in the resulting picture-in-picture image may be arranged in a side-by-side (or top-bottom) configuration as illustrated in FIG. 8.

Figure 8:
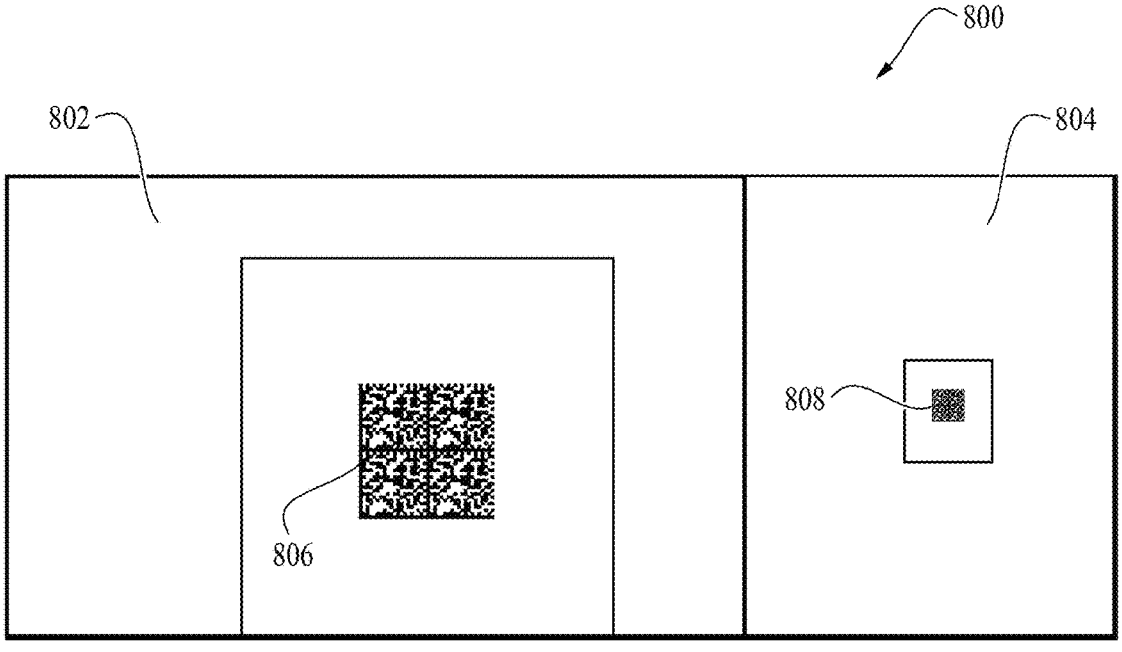
FIG. 8 illustrates an example picture-in-picture image for the multi-sensor system of FIG. 1 using images captured by a far-field image sensor (left) and a near-field image sensor (right) in accordance with one embodiment.

With reference to FIG. 8, in a side-by-side configuration, superimposing one camera frame over the other will leave the left/right (or top/bottom) portion of the background frame. If only a portion of the images is shown in the picture-in-picture image 800, it is usually more useful to show a central portion of the images, or the portion of the images centered on the aiming system since that would most likely capture the optical codes 806, 808 in the image 800. Using windowing on the background image 804, it is possible to change which part of the background image 804 is shown in the non-overlapping portion next to the far-field image 802. We can consider for example with the 1920×800 background image 804 with windowing on the left part and some "padding" before the actual column information. The effect here is that the background image 804 is shifted by some pixels to the right, with the left portion (including the "padding" of the background image 804 covered by a far-field image 802 having a resolution of 1280×800. Taking the prior picture shown in FIGS. 3-4 modified in this fashion (¼ width shift to the right=320 pixels for background image) results in the picture-in-picture image 800 illustrated in FIG. 8, where both optical codes 806, 808 are contained with the frame for decoding.

In the example embodiments illustrated in FIGS. 3-8, the respective picture-in-picture image outputs illustrate the far-field image superimposed on the near-field image to minimize potential overlap between the images. It should be understood that in other embodiments, the arrangement may be reversed such that the picture-in-picture image output is instead configured with the far-field image serving as the background image covered by the near-field image. Further, all of the principles of the disclosed subject matter, including the resizing techniques described herein, apply equally in the reversed configuration.

In some embodiments, various general principles may be applied to ensure that the picture-in-picture image format generated by the processor 110 is suitable for decoding in the vast majority of cases using the various strategies discussed previously with reference to FIGS. 3-9 with the aim of streamlining the overall image-analysis process. The following discussion sets forth some principles for employing various image-processing techniques based primarily on the general assumptions that a large optical code as captured in the images will tend to have a lower resolution and small optical code as captured in the images will tend to have a higher resolution. With these assumptions, one can create a simplified algorithm for applying various image-processing techniques as further discussed below.

In view of the above-referenced assumptions, a first general principle is that if an optical code is both big and near relative to the imaging sensors, the optical code will likely occupy most of the field-of-view of the near-field image sensor and would be cropped (at least partially) in the far-field image sensor. In this scenario, both binning (such as the 2×2 binning technique described earlier) or windowing to extract a target region-of-interest may be good image-processing strategies to generate a picture-in-picture image that is more likely to be successfully decoded. In some cases, the processor 110 may only present the output from the near-field image sensor and ignore the output from the far-field image sensor since the optical code may be substantially cropped such that binning or windowing would not yield a resized image with a decodable optical code.

If the optical code is large and at mid-range, the optical code appears small in the field-of-view of the near-field image sensor and large in the field-of-view of the far-field image sensor. Accordingly, binning (such as 2×2 or 2×1 binning) may be appropriate strategies to generate a picture-in-picture image with a good opportunity to decode both optical codes.

If the optical code is large and far, the optical code may be undecodable in the near-field image and would likely occupy a substantially central portion of the far-field image. Accordingly, both binning (if the far-field image has sufficient resolution) and windowing (if the optical code is not cropped) may be appropriate.

If the optical code is small and near, the optical code likely occupies a small portion of the near-field image and is undecodable in the far-field image. Accordingly, both binning (such as 2×2 binning) and windowing (if the optical code is not cropped) may be appropriate. In some cases, the processor 110 may only present the output from the near-field image sensor and ignore the output from the far-field image sensor.

If the optical code is small and at mid-range, it is likely undecodable from a near-field image and occupies a significant portion of the field-of-view of the far-field image sensor. Accordingly, a full resolution of the far-field image may be binned (such as 2×2 or 2×1 binning if sufficient resolution) or a windowing technique may be applied.

Finally, if the optical code is small and far, it is likely undecodable from the near-field image and occupies a small portion of the far-field image. Accordingly, a windowing technique may be applied to focus on a region-of-interest in the far-field image containing the optical code for decoding.

Below is a schematic representation summarizing the above-referenced principles based on a relative distance of the target item from the image sensors:

| Distance | Small/High Resolution | Large/Low Resolution |
|---|---|---|
| NEAR | Bin, Window, Near-Field Imager Only | Bin, Window, Near-Field Imager Only |
| MID | Far-Field Imager Full Resolution, Bin, Window | Bin |
| FAR | Window | Bin, Window |

Figure 9:
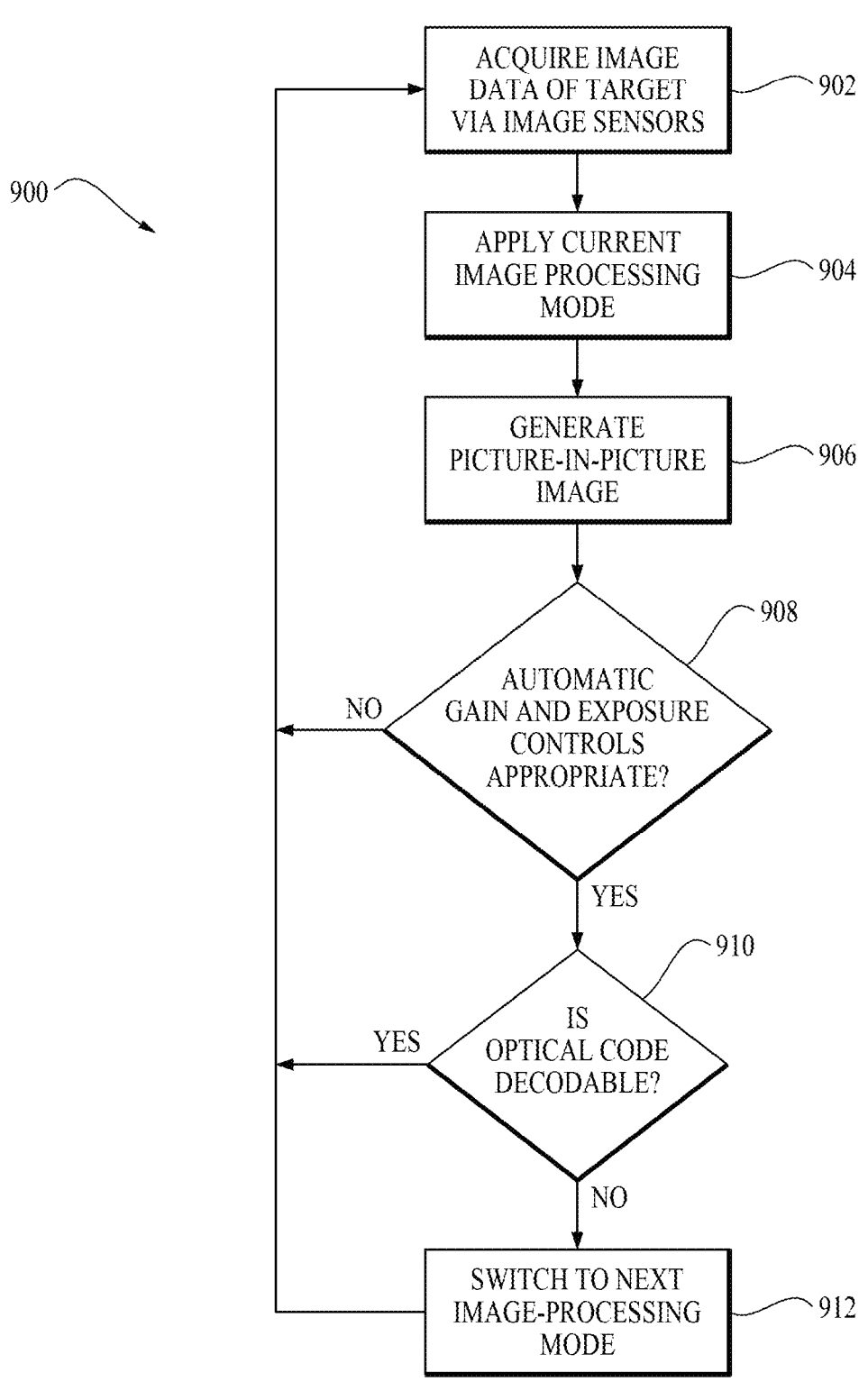
FIG. 9 is a flowchart illustrating an example method for using various image-processing modes to generate a decodable image for the multi-sensor system of FIG. 1 in accordance with one embodiment.

In some embodiments, the processor 110 of the multi-camera system 100 may incorporate the above-referenced general principles into a mode-sequence algorithm where the processor 110 (and/or the decoding unit 112) automatically cycles through various image processing techniques in sequence in an attempt to decode any optical codes captured by the image sensors 102A, 102B. FIG. 9 is a flowchart illustrating an example mode-sequence method 900 using the above-referenced principles in accordance with one embodiment. It should be understood that the method 900 incorporates many of the same steps and related detail described previously with reference to method 200. Accordingly, some details in the method 900 may not be fully described below to avoid repetition with the understanding that corresponding details described in method 200 apply equally to method 900 as well.

With reference to FIG. 9, at step 902, the image sensors 102A, 102B acquire image data of the target 50 in a similar fashion as described previously with reference to method 200. At step 904, the processor 110 applies a current image-processing mode to resize one of the images (e.g., the far-field image as described in previous embodiments). As described in the preceding paragraphs, resizing the image from one of the sensors using a 2×2 binning image-processing technique tends to result in a picture-in-picture image where the optical code in both the smaller image and the background image is decodable in most cases. Accordingly, the first image-processing mode in the sequence may be to apply a 2×2 binning technique to minimize the need to cycle through other image-processing modes. This binning mode may be a default image-processing mode that initiates every new image-capture sequence for the method 900 after a successful decode.

Thereafter, at step 906, the processor 110 generates a picture-in-picture image combining the image data obtained from the image sensors 102A, 102B. As described previously, the picture-in-picture image is generated with the resized image from one image sensor (e.g., the far-field image sensor) superimposed on the background image of the second image sensor (e.g., the near-field image sensor). As noted in step 904, the image in the picture-in-picture image is initially resized using a 2×2 bin (or other suitable binning technique).

Thereafter, at step 908, the processor 110 determines whether the auto-exposure and auto-gain conditions are acceptable for the picture-in-picture image as compared to threshold values or other suitable parameters. If no, method 900 follows the NO branch and returns to step 902 to acquire additional images and repeat steps 904, 906. If the parameters are acceptable, the method 900 follows the YES branch to step 910. At step 910, the decoding unit 112 attempts to decode the optical codes from the picture-in-picture image containing the combined image data from the imaging sensors 102A, 102B. If the decoding process is successful, the method 900 follows the YES branch back to step 902 to begin again and acquire images for another item for processing. If the decoding process is unsuccessful, the method 900 follows the NO branch to step 912.

At step 912, the processor 110 selects a new image-processing mode in the sequence and returns to step 902 to acquire images of the target 50 for processing using the new image-processing mode. As noted in the prior discussion, a windowing technique may be a good follow-up technique in the case where binning fails to yield a decodable image. Windowing has a high likelihood of success if there are high resolution optical codes present that cannot be decoded while employing a binning process at current image resolution. Using the new image-processing mode, the method 900 is repeated as described above.

If the decoding processing is successful using the new image-processing mode, the method 900 returns to step 902 and the image-analysis mode resets back to its default mode for processing of additional items. In the example provided above, the image-processing mode resets to a binning technique. If, however, a decode at step 910 is unsuccessful using the new image-processing mode, the method 900 selects yet another image-processing mode at step 912 and is repeated using the newly selected image-processing mode.

The method 900 may include any number of image-processing modes arranged in any suitable order depending on the environment for use and may be repeated to cycle through the sequence of image-processing modes as needed until the optical code is successfully decoded. In the examples provided above, the method 900 may alternate between 2×2 binning (as the first mode), windowing (as the second mode), far-field imager only at full resolution (as the third mode), and near-field imager only (as the fourth mode). This configuration for the image-processing mode sequence may optimize the method 900 since the techniques are arranged in order of likely success for use in a retail environment. Again, however, other embodiments may rearrange this example mode sequence or may substitute other suitable image-processing techniques for those provided in this example. In addition, it should also be understood that in other embodiments, various steps provided in the method 900 may be combined, altered, or rearranged without departing from the principles of the disclosed subject matter.

Figure 10:
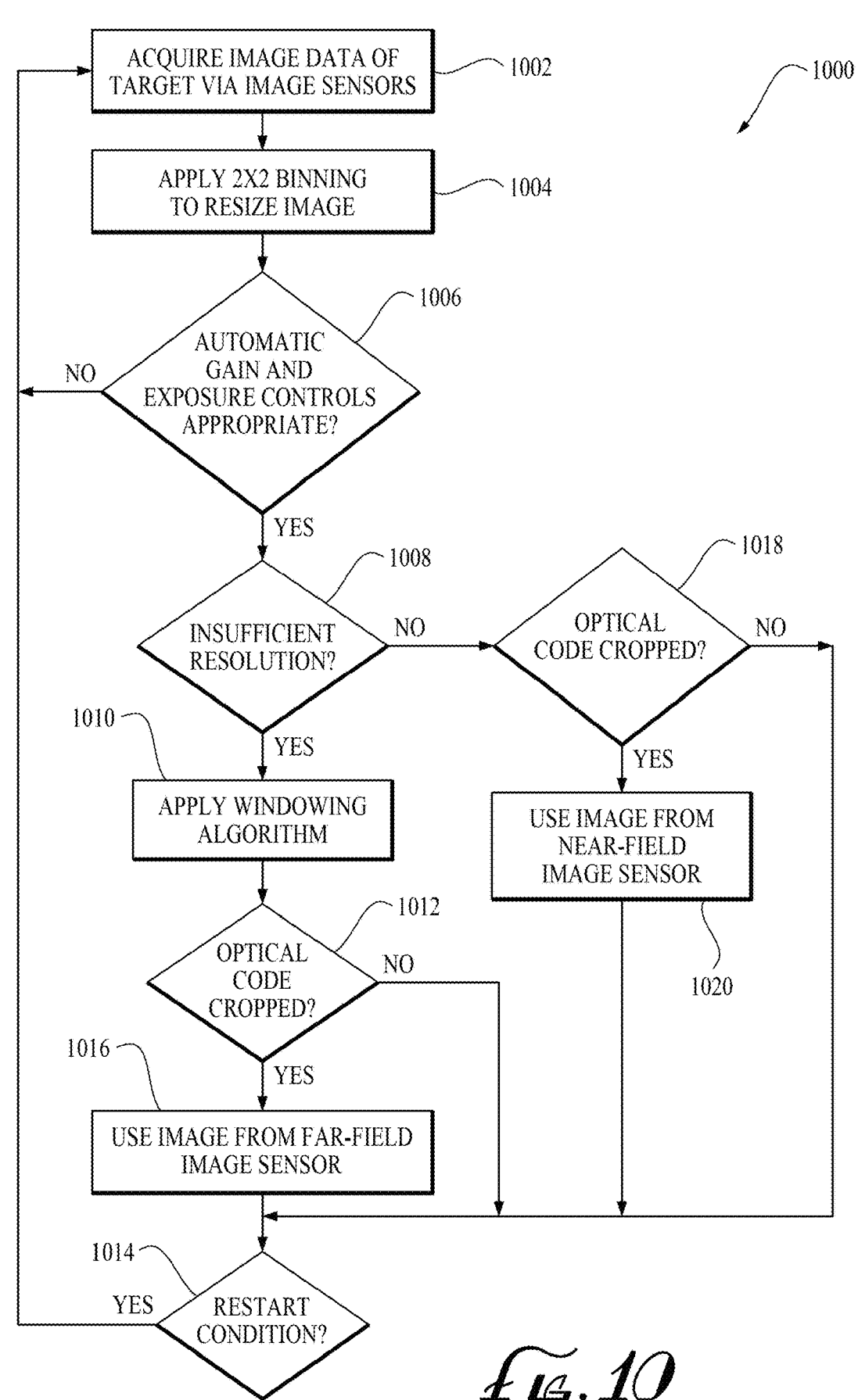
FIG. 10 is a flowchart illustrating another example method for using various image-processing modes to generate a decodable image for the multi-sensor system of FIG. 1 in accordance with one embodiment.

FIG. 10 is a flowchart illustrating another method 1000 for using image-resizing and other suitable processing techniques to combine image data from multiple sensors to generate a combined image for decoding in accordance with one embodiment. With reference to FIG. 10, at step 1002, the image sensors 102A, 102B acquire image data of the target 50 in a similar fashion as described previously with reference to method 200. At step 1004, the processor 110 applies a suitable binning algorithm to one of the images (e.g., the far-field image) to resize the image as described previously. In some embodiments, as illustrated in FIG. 10, the processor 110 may apply a 2×2 binning algorithm.

At step 1006, the processor 110 determines whether auto-exposure and auto-gain conditions are acceptable as compared to threshold values or other suitable parameters. If no, method 1000 follows the NO branch and returns to step 1002. If yes, the method 1000 follows the YES branch to step 1008, where the processor 110 determines whether the optical codes in the image have insufficient resolution. If yes, method 1000 follows the YES branch to step 1010, where the processor 110 applies a windowing technique. Thereafter, at step 1012, the processor 110 determines whether the optical codes in the windowed image have been cropped. If no, method 1000 follows the NO branch. At step 1014, the processor 110 determines whether a restart condition has been satisfied. If the image is successfully decoded, that result triggers a restart, whereby method 1000 follows the YES branch back to step 1002 to restart the method 1000 to process another item. If a restart condition has not been satisfied, the decoding unit 112 may attempt to decode again, or the method 1000 may return to step 1002 if the system times out or other restart condition is met to begin again.

Returning to decision 1012, if the processor 110 instead determines that the optical code has been cropped as a result of the windowing mode applied at step 1010, method 1000 follows the YES branch. At step 1016, the processor 110 obtains a full resolution image from the far-field image sensor and the decoding unit 112 attempts to decode the full resolution image. If the image is successfully decoded, that result triggers a restart at step 1014. Thereafter, method 1000 follows the YES branch back to step 1002 to restart the method 1000 to process another item. If the restart condition is not satisfied, the decoding unit 112 may attempt to decode again, or the method 1000 may return to step 1002 if the system times out or other restart condition is met as mentioned previously.

Returning now to decision 1008, if the processor 110 instead determines that the image does not have insufficient resolution, method 1000 follows the NO branch to step 1018. At step 1018, the processor 110 determines whether the optical codes in the binned image have been cropped. If no, the method 1000 follows the NO branch to step 1014, where the processor determines whether a restart condition has been satisfied. If yes, meaning that the optical code has been decoded, method 1000 follows the YES branch and returns to step 1002 to process another item. If the restart condition is not satisfied, the decoding unit 112 may attempt to decode again, or the method 1000 may return to step 1002 if the system times out or other restart condition is met as mentioned previously.

Returning to decision 1018, if the processor 110 instead determines that the optical codes have been cropped, method 1000 follows the YES branch to step 1020. At step 1020, the processor 110 uses the image from the near-field image sensor only and the decoding unit 112 attempts to decode the image. If the image is successfully decoded, that result triggers a restart at step 1014, where method 1000 follows the YES branch back to step 1002 to restart the method 1000 and process another item. If the restart condition is not satisfied, the decoding unit 112 may attempt to decode again, or the method 1000 may return to step 1002 if the system times out or other restart condition is met as mentioned previously.

It should be understood that the method 1000 provides an example algorithm and is not meant to be limiting. In other embodiments, the method 1000 may be altered and different image-processing modes may be added and/or substituted for those described. For example, in one embodiment, a 2×1 binning technique may be selected if the resolution is insufficient only in one axis of the image. In other embodiments, the multi-sensor system 100 may incorporate a rangefinder (or may otherwise receive range data to the target 50) to measure a distance to the target item 50. Based on the results of the rangefinder, the method 1000 may skip directly to using the image from the near-field image sensor (as described in step 1018) when the target item 50 is near, or using the image from the far-field image sensor (as described in step 1014) when the target item 50 is far, or using the picture-in-picture image in cases when the target item 50 is at an intermediate distance. The determination of whether an item is near or far may be evaluated by comparison the measured distanced to a predetermined threshold value. In other embodiments, the mode selection methods described with reference to FIGS. 9 and 10 may work in parallel and in sync with an autofocus system of the image sensors (if one or both image sensors incorporate one) to improve overall performance.

In the embodiments described herein, the methods 200, 900, 1000 assume that the image sensors are each capturing the same optical code for decoding from one item. In other embodiments, however, it is possible that the image sensors may capture two different decodable optical codes. For example, the near-field image sensor may capture one optical code and the far-field image sensor may capture a different optical code. In such embodiments, the methods described herein may include a decoding priority policy in the case that two separate decodable optical codes are captured. The priority policy may define which optical code is to be decoded.

In most embodiments, the multi-sensor system 100 will be capturing the same optical code using both imaging sensors. In this case, a proper setting should also decide the decoding priority policy. For example, the priority might be to use the optical code captured by the near-field imaging sensor if its bounding box is inside the field-of-view (more likely to decode high resolution optical codes). Alternatively, the far-field imaging sensor may be used instead if resolution is sufficient since it may provide an overall faster decoding process due to a lower resolution image with fewer pixels to process.

In some cases, it may be useful to stitch the images from the image sensors 102A, 102B to optimize the decoding process. FIG. 11 is a schematic illustrating an image stitching process 1100 for combining images from the image sensors 102A, 102B of the multi-sensor system 100 of FIG. 1. With reference to FIG. 11, when the optical code 1102 is partially captured in the smaller sized image contained within the picture-in-picture image, and a remaining portion of the optical code 1102 is otherwise present in the larger background image of the picture-in-picture image, the processor 110 may stitch the resized image and the background image together for decoding via the decoding unit 112. This image-stitching process is particularly suitable if the fields-of-view of the two imaging sensors 102A, 102B are partially overlapping, and it works regardless of whether the imaging sensors 102A, 102B have the same or different focus positions or the same or different resolutions. For example, one may wish to have a very large field-of-view combining two imaging sensors with the same resolution (e.g., 1280×800) to generate a single 1920×800 image. A similar arrangement may allow for stereo matching that can be used in a calibrated system for incorporating distance information and eventually realizing a three-dimensional camera.

The examples illustrated and described in FIGS. 2-10 primarily reference a configuration where the image sensors are monochromatic image sensors. However, as noted previously, other configurations for the image sensors are also contemplated and fall within the scope of the disclosure. The following provides a brief description for an embodiment using a global shutter camera and a rolling shutter camera (FIG. 12), and an embodiment using a monochromatic image sensor and a color image sensor (FIG. 13).

FIG. 12 illustrates an example picture-in-picture image output 1200 for the multi-sensor system of FIG. 1 using an image 1202 captured by a global shutter camera (upper left corner) and an image 1204 captured by a rolling shutter camera (background) in accordance with one embodiment. In a similar fashion as described previously, the images from the global shutter camera and the rolling shutter camera may be combined by a processor (e.g., processor 110) to generate a picture-in-picture image 1200 containing both images. In some embodiments, the higher resolution image of the target item may be from the rolling shutter camera, which typically has good resolution and overall image quality, but poor motion tolerance. In the same field-of-view, a global shutter camera (typically lower resolution but with good motion tolerance) may be used to capture an image of the target item.

In FIG. 12, the target is a fast-spinning wheel with optical codes. In one embodiment, the resulting picture-in-picture image 1200 includes the global shutter image 1202 (e.g., the image with lower resolution) superimposed onto the rolling shutter image 1204 (e.g., the image with higher resolution). As illustrated in FIG. 12, the global shutter image 1202 is essentially able to freeze movement of the fast-spinning wheel and provide good motion tolerance to the decoding unit 112, while the rolling shutter image 1204 provides better resolution. In the background image 1204, the typical rolling shutter deformation is visible, thereby rendering the optical codes 1206 undetectable in this embodiment. However, the global shutter image 1202 clearly captures the optical codes 1208 for decoding by the decoding unit 112.

Figure 13:
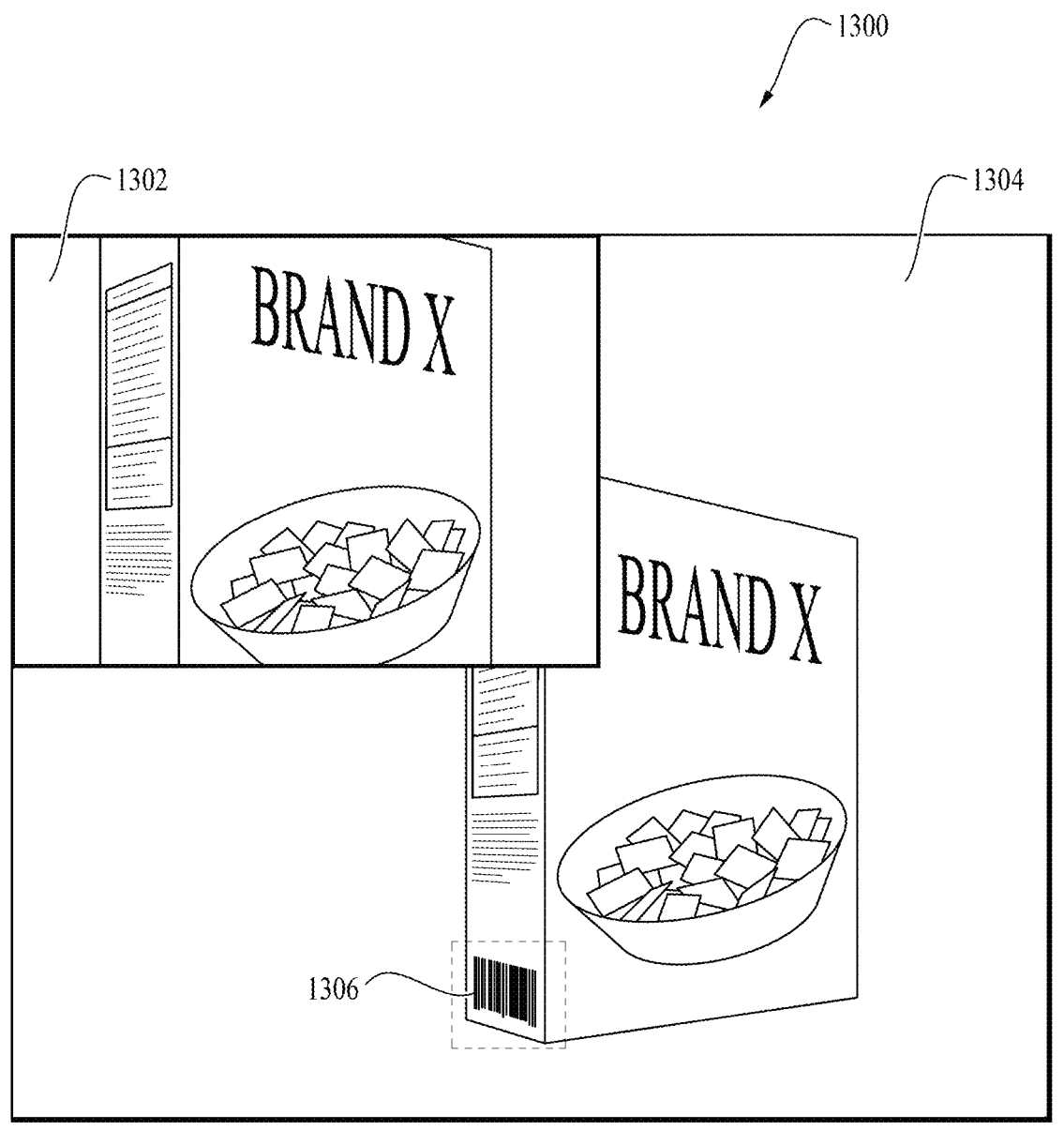
FIG. 13 illustrates an example picture-in-picture image for the multi-sensor system of FIG. 1 using images captured by a color sensor (upper left corner) and a monochromatic sensor (background) in accordance with one embodiment.

FIG. 13 illustrates an example picture-in-picture image output 1300 for the multi-sensor system of FIG. 1 using images captured by a color sensor (upper left corner) and a monochromatic sensor (background) in accordance with one embodiment. In this configuration, the color sensor has lower resolution and a relatively small field-of-view but can decode watermark color-coded data contained in package graphics. The monochromatic sensor, on the other hand, has higher resolution and a wider field-of-view, but cannot decode color-coded information.

In a similar fashion as described previously, the picture-in-picture image 1300 is arranged to have the lower resolution image 1302 (e.g., the color image) superimposed on the higher resolution image 1304 (e.g., the monochromatic image) for efficient decoding. In this embodiment, the optical code (not shown) is out of the narrow field-of-view of the color sensor. However, the optical code 1306 is captured by the monochromatic sensor and can be decoded from the picture-in-picture image 1300.

As noted previously, the foregoing examples described with reference to FIGS. 1-13 related to a multi-sensor system 100 having two image sensors 102A, 102B. As also noted previously, one having ordinary skill in the art understands that the multi-sensor system 100 embodying the principles disclosed herein may include any number of image sensors for generating a picture-in-picture image using images obtained from some or all of the image sensors. With reference to FIG. 14, the following describes an example embodiment of a multi-sensor image system including at least four image sensors, where the combined output including image data from the four image sensors is generated in a picture-in-picture format as further described in detail below.

With reference to FIG. 14, the image sensors (not shown) may include many of the same components (e.g., processing unit, circuitry, processor, decoding unit, etc.) arranged in a similar format as described with reference to image sensors 102A, 102B of FIG. 1. To avoid duplication, these components are not further described herein with the understanding that the corresponding features of the image sensors 102A, 102B described previously apply equally to the four image sensors described with reference to FIG. 14.

With reference to FIG. 14, the multi-sensor image system in one embodiment may include four image sensors, such as: a near-field image sensor, a midrange image sensor, a far-field image sensor, and a color image sensor. In this configuration, the picture-in-picture image 1400 may be generated using a similar process as described previously where the processor (e.g., processor 110) merges the image data obtained from each of the four image sensors to generate a single, combined image containing the image data (or portions thereof) obtained from each sensor for decoding and further analysis. For example, in one embodiment, the picture-in-picture image 1400 may include image data 1402 from the near-field image sensor arranged on a first portion of the picture-in-picture image 1400, image data 1404 from the midrange sensor arranged on a second portion of the picture-in-picture image 1400, image data 1406 from the far-field sensor arranged on a third portion of the picture-in-picture image 1400, and image data 1408 from the color sensor (image data 1408 in FIG. 14 not reproduced in color) arranged on a fourth portion of the picture-in-picture image 1400.

In a similar fashion as noted previously, the picture-in-picture image 1400 may be generated to position the different image data 1402, 1404, 1406, 1408 from each image sensor in an arrangement that improves the likelihood of decoding the optical code or other target data based on the characteristics (including any image-processing techniques such as binning and windowing) of the image sensors comprising the multi-sensor system. For example, as illustrated in FIG. 14, the image data 1402 from the near-field image sensor may serve as the background image (as it may yield the highest resolution image of the four sensors), where the image data 1404, 1406, 1408 from the other three sensors is superimposed on various surrounding regions as foreground images. With reference to FIG. 14, the image data 1404 from the midrange sensor may be cropped in a similar fashion as described previously to focus on the target data (e.g., the optical code 1410) captured in the image and to reduce the image size to minimize potential obstruction of the background image data 1402. Similarly, the image data 1406 from the far-field sensor may be binned (e.g., 2×1 binning) in a similar fashion as described previously to focus on the target data (e.g., the optical code 1412) and minimize potential obstruction of the background image data 1402. The color image data 1408 from the color image sensor may also be sized (or otherwise cropped) to minimize obstruction with other data. In this configuration, the resulting picture-in-picture image 1400 includes the image data 1402, 1404, 1406, 1408 arranged in a fashion where the target data may be analyzed from some or all of the image sensors in a similar fashion as described previously with reference to FIGS. 1-13.

In general, the picture-in-picture image 1400 may be generated by considering the image data of any one selected sensor as a background image, wherein the image data from all or a subset of the remaining available sensors, according to their specific characteristics (such as optical focusing, resolution, color, etc.) and/or according to the specific application of the multi-sensor system, is superimposed on a selected region of the image captured by the first sensor as foreground images. In some embodiments, the picture-in-picture image 1400 may be generated by including image data from an imaging sensor with a lower resolution (e.g., the far-field image sensor) and image data from another imaging sensor (e.g., the color sensor) superimposed on a region (e.g., an upper or lower left-hand corner, an upper or lower right-hand corner, or other suitable configuration) of the image data coming from an image sensor with a higher resolution (e.g., the near-field image sensor). This arrangement may be helpful for watermark applications.

Another example exploiting more than two sensors includes an embodiment of a system able to correctly decode optical codes that can be positioned at different distances without having to use a variable focus lens. Such a system may include, for example, three fixed-focus optical cameras, each of which is focused at a specific target distance (e.g., near, middle and far). In this configuration, the resulting picture-in-picture image may be generated by selecting the region from the image data captured by each sensor where an optical code is most likely present based on the focus setting of each camera. In this case, the picture-in-picture image includes information captured at different distances (near, middle, and far) and the system can then decode the portion of the picture-in-picture image where the optical code is captured with the best focus. This solution may be an alternative to the use of variable focus optics.

As described, the methods and the related systems illustrated in the figures provide an efficient, streamlined process for combining image streams from multiple image sensors in a multi-sensor system to generate a combined image in a picture-in-picture format for decoding. The image sensors may be the same or may comprise different image outputs, resolutions, and/or operate using different technologies. As described herein, the picture-in-picture image includes one of the images (typically that having a lower resolution) superimposed on the second image (typically that having a higher resolution) to maximize the likelihood that the optical codes are decodable in both images when processing the picture-in-picture image. In this fashion, the decoding unit is able to efficiently process the image data obtained from the image sensors by analyzing a single combined image regardless of the configuration of the image sensors and without requiring advanced knowledge or determination of a distance to the target.

It should be understood that in some embodiments, certain of the steps described in methods herein may be combined, altered, varied, and/or omitted without departing from the principles of the disclosed subject matter. It is intended that subject matter disclosed in one portion herein can be combined with the subject matter of one or more of other portions herein as long as such combinations are not mutually exclusive or inoperable. In addition, many variations, enhancements and modifications of the systems and methods described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A multi-sensor system for decoding optical codes, the system comprising:
   a first image sensor configured to obtain a first image of an item bearing an optical code as the item passes across a field-of-view of the first image sensor;
   a second image sensor configured to obtain a second image of the item bearing the optical code as the item passes across a field-of-view of the second image sensor;
   a processor configured to receive the first image from the first image sensor and the second image from the second image sensor, wherein the processor is further configured to generate a picture-in-picture image containing the first image and the second image, wherein the picture-in-picture image includes the first image superimposed on the second image; and
   a decoding unit configured to receive the picture-in-picture image and decode the optical code from one or both of the first image and the second image through analysis of the picture-in-picture image.

2. The multi-sensor system of claim 1, wherein the first image obtained by the first image sensor has an image size that is smaller as compared to the second image obtained by the second image sensor.

3. The multi-sensor system of claim 2, wherein the first image sensor is a far-field camera with a far-field field-of-view and the second image sensor is a near-field camera with a near-field field-of-view.

4. The multi-sensor system of claim 1, wherein the processor is further configured to resize the first image such that the first image is smaller as compared to the second image.

5. The multi-sensor system of claim 4, wherein the processor is further configured to resize the first image by reducing a pixel count of the first image.

6. The multi-sensor system of claim 5, wherein the processor is further configured to resize the first image by defining a region-of-interest within the first image, and wherein the first image in the picture-in-picture image includes only the defined region-of-interest.

7. The multi-sensor system of claim 1, wherein one of the first image sensor and the second image sensor is a color image sensor and the other of the first image sensor and the second image sensor is a monochromatic image sensor.

8. The multi-sensor system of claim 1, wherein one of the first image sensor and the second image sensor is a rolling shutter image sensor and the other of the first image sensor and the second image sensor is a global shutter image sensor.

9. The multi-sensor system of claim 1, wherein one of the processor or the decoding unit is further configured to stitch from the picture-in-picture image a portion of the optical code contained in the first image with a portion of the optical code contained in the second image to generate a stitched optical code, and wherein the decoding unit is further configured to decode the stitched optical code.

10. The multi-sensor system of claim 1, further comprising a third image sensor configured to obtain a third image of the item bearing the optical code as the item passes across a field-of-view of the third image sensor, wherein:
   the processor is further configured to receive the third image from the third image sensor and generate the picture-in-picture image further containing the third image, wherein the picture-in-picture image includes two of the first image, the second image, and the third image superimposed on the other of the first image, the second image, and the third image, and wherein the decoding unit is further configured to analyze the picture-in-picture image and decode the optical code from at least one of the first image, the second image, and the third image through analysis of the picture-in-picture image.

11. The multi-sensor system of claim 10, further comprising:
   a fourth image sensor configured to obtain a fourth image of the item bearing the optical code as the item passes across a field-of-view of the fourth image sensor, wherein:
   the processor is further configured to receive the fourth image from the fourth image sensor and generate the picture-in-picture image further containing the fourth image, wherein the picture-in-picture image includes three of the first image, the second image, the third image, and the fourth image superimposed on the other of the first image, the second image, the third image, and the fourth image, and wherein the decoding unit is further configured to analyze the picture-in-picture image and decode the optical code from at least one of the first image, the second image, the third image, and the fourth image through analysis of the picture-in-picture image.

12. A method for decoding optical codes in a multi-sensor system, the method comprising:

obtaining, via a first image sensor, a first image of an item bearing an optical code as the item passes across a field-of-view of the first image sensor;

obtaining, via a second image sensor, a second image of the item bearing an optical code as the item passes across a field-of-view of the second image sensor;

receiving, via a processor, the first image from the first image sensor and the second image from the second image sensor;

generating, via the processor, a picture-in-picture image containing the first image and the second image, wherein the picture-in-picture image includes the first image superimposed on the second image;

analyzing, via a decoding unit, the picture-in-picture image;

decoding, via the decoding unit, the optical code from one or both of the first image and the second image through analysis of the picture-in-picture image;

determining, via the processor, a resolution of the first image and the second image;

comparing, via the processor, the resolution to a threshold value;

determining, via the processor, whether the optical code in either or both of the first image and the second image is cropped, wherein when the optical code in either or both of the first image and the second image is cropped, the method further comprising:

decoding, via the decoding unit, the first image from the first image sensor in response to the resolution failing to equal or exceed the threshold value; and decoding, via the decoding unit, the second image from the second image sensor in response to the resolution equaling or exceeding the threshold value.

13. The method of claim 12, further comprising resizing, via the processor, the first image such that the first image is smaller as compared to the second image.

14. The method of claim 13, wherein the step of resizing the first image further includes applying, via the processor, a first image-processing mode from a plurality of selectable image-processing modes.

15. The method of claim 14, further comprising applying, via the processor, a second image-processing mode from the plurality of selectable image-processing modes in response to the decoding unit failing to decode the optical code after application of the first image-processing mode.

16. A method for decoding optical codes in a multi-sensor system, the method comprising:

obtaining, via a first image sensor, a first image of an item bearing an optical code as the item passes across a field-of-view of the first image sensor;

obtaining, via a second image sensor, a second image of the item bearing an optical code as the item passes across a field-of-view of the second image sensor;

receiving, via a processor, the first image from the first image sensor and the second image from the second image sensor;

applying, via the processor, a first image-processing mode from a plurality of selectable image-processing modes to one or both of the first image and the second image;

generating, via the processor, a picture-in-picture image containing the first image and the second image as processed via the first image-processing mode, wherein the picture-in-picture image includes the first image superimposed on the second image;

analyzing, via a decoding unit, the picture-in-picture image; and decoding, via the decoding unit, the optical code from one or both of the first image and the second image through analysis of the picture-in-picture image, wherein in response to a failed decoding attempt by the decoding unit, the method further comprising:

selecting, via the processor, a second image-processing mode from a plurality of selectable image-processing modes;

applying, via the processor, the second image-processing mode to one or both of the first image and the second image;

generating, via the processor, a second picture-in-picture image containing the first image and the second image as processed via the second image-processing mode, wherein the picture-in-picture image includes the first image superimposed on the second image;

analyzing, via a decoding unit, the second picture-in-picture image; and decoding, via the decoding unit, the optical code from one or both of the first image and the second image through analysis of the second picture-in-picture image.

17. The method of claim 16, wherein the plurality of selectable image processing modes includes a binning mode operable to reduce pixel count of one or both of the first image and the second image, a windowing mode operable to define a region-of-interest for one or both of the first image and the second image, a first sensor mode operable to retrieve the first image obtained by the first sensor, and a second sensor mode operable to retrieve the second image obtained by the second sensor.

18. The multi-sensor system of claim 1, wherein the processor is further configured to:

analyze a gain control parameter and an exposure control parameter for the first image and the second image; and compare the gain control parameter and the exposure control parameter to a threshold value, wherein in response to either or both the gain control parameter and the exposure control failing to equal or exceed the threshold value, the processor signals the first image sensor and the second image sensor to obtain a new image of the item, and wherein in response to both the gain control parameter and the exposure control equaling or exceeding the threshold value for the first image and the second image, the processor is further configured to:

determine a resolution of the first image and the second image;

compare the resolution to a threshold value; and apply a windowing image-processing mode to determine a region-of-interest in one or both of the first image and the second image in response to the resolution equaling or exceeding the threshold value.

19. The multi-sensor system of claim 1, wherein the processor is further configured to:

determine a resolution of the first image and the second image;

compare the resolution to a threshold value;

determine whether the optical code in either or both of the first image and the second image is cropped, wherein when the optical code in either or both of the first image and the second image is cropped, the decoding unit is further configured to:

decode the first image from the first image sensor in response to the resolution failing to equal or exceed the threshold value; and decode the second image from the second image sensor in response to the resolution equaling or exceeding the threshold value.

\* \* \* \* \*